US006975722B2

(12) United States Patent
Davis et al.

(10) Patent No.: US 6,975,722 B2
(45) Date of Patent: Dec. 13, 2005

(54) DUAL ECHO CANCELLER WITH FAST REFLECTOR IDENTIFICATION

(75) Inventors: Charles R. Davis, Palo Alto, CA (US); David Shvarts, Cupertino, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/330,429

(22) Filed: Dec. 30, 2002

(65) Prior Publication Data

US 2004/0125945 A1    Jul. 1, 2004

(51) Int. Cl.[7] ............................................. H04M 9/08
(52) U.S. Cl. ..................... 379/406.08; 379/406.01; 379/406.02; 379/406.06; 379/406.09
(58) Field of Search ...................... 379/406.01–406.16

(56) References Cited

U.S. PATENT DOCUMENTS

| | | | |
|---|---|---|---|
| 3,789,165 A | | 1/1974 | Campanella et al. ..... 179/170.2 |
| 4,031,338 A | | 6/1977 | Campanella et al. ..... 179/170.8 |
| 4,980,640 A | * | 12/1990 | Van Ormondt et al. ..... 324/307 |
| 5,664,011 A | * | 9/1997 | Crochiere et al. ..... 379/406.08 |
| 5,764,753 A | * | 6/1998 | McCaslin et al. ...... 379/406.07 |
| 5,978,085 A | * | 11/1999 | Smith et al. ................. 356/521 |
| 6,031,908 A | * | 2/2000 | Laberteaux et al. ... 379/406.09 |
| 6,181,793 B1 | * | 1/2001 | Laberteaux et al. ... 379/406.08 |
| 6,563,461 B1 | * | 5/2003 | Elgersma et al. ........... 342/458 |
| 2003/0053617 A1 | * | 3/2003 | Diethorn ................ 379/406.08 |

* cited by examiner

*Primary Examiner*—Sinh Tran
*Assistant Examiner*—Ramnandan Singh
(74) *Attorney, Agent, or Firm*—Abdul Zindani; Wade James Brady, III; Frederick J. Telecky, Jr.

(57) ABSTRACT

An echo canceller, which includes, receives and sends paths connected to standard telecommunication interfaces, a non adaptive filter with filter reflection coefficients which generate an estimated echo signal, which when subtracted from the send path input produces a nearly echo free send path output, an adaptive filter generating a second estimated echo signal, which when subtracted from the send signal, provides a possible alternative nearly echo free send path signal, a fast non iterative least squares method of estimating a reflection, a controller means which, in response to an observed non echo free send path output, causes the fast non iterative least squares method to search for possible new reflections, and a controller means for expurgating unnecessary reflection coefficients in the non adaptive filter.

5 Claims, 4 Drawing Sheets

DUAL ECHO CANCELLER WITH FAST REFLECTOR IDENTIFICATION

FIELD OF THE INVENTION

The present invention relates to Echo Cancellers with multiple filters, or multiple means of determining the reflection coefficients.

BACKGROUND OF THE INVENTION

Line echoes, or hybrid echoes, naturally occur in telecommunications networks wherein a portion of the transmission path consists of a two wire segment. Typically two wire segments are found between telephone company offices and the customer or subscriber. Echo occurs, therefore, on most all typical telephone calls. This echo is not perceived as such by the participants unless the time delay between the participants is greater than approximately 10 ms. Since nearly all local calls have a delay less than 10 ms, echo is perceived as a problem primarily on long distance calls. In such calls, the delay between two talkers may range from 10 ms to over 250 ms, if a geostationary satellite is involved. In this latter case, the round trip delay is the sum of the delay in both directions and would be over 500 ms. When echo is present, the speakers hear their own voice with a 500 ms delay. This can generally be quite disruptive and disconcerting.

On long distance transmission paths, echo cancellers are normally employed, one at each end. The typical operation of conventional echo cancellers using adaptive filters can be found in a number of references, such as: U.S. Pat. No. 3,789,165 to Campanella et al.; U.S. Pat. No. 4,031,338 to Campanella et al. and U.S. Pat. No. 5,664,011 to Crochiere et al. In a transversal filter of the prior art, the echo generated by the two wire transmission path may be effectively estimated and subtracted from the send direction signal, thus providing a nearly echo free signal. Effective estimation and subtraction is commonly referred to as convergence, as the estimated echo cancellation signal converges toward a close replication of the echo signal. A principal problem with this approach is that sometimes the echo of the far end signal can be and typically is combined with the signal of the speaker at the near end. The situation is called double talk when both the near end and far end speaker are speaking at the same time. In this case, the adaptive estimation procedure can become confused and may diverge temporarily, causing increased echo.

Ochiai et al. "Echo Canceller with Two Echo Models" IEE Transactions on Communication vol. COM-25, No. 6 June 1977, pp. 589–595, proposed a dual filter approach, as illustrated in FIG. 1, wherein one filter 18, a non-adaptive filter, is used to cancel the echo. Since filter 18 is never adapted, filter 18 is never disturbed by double talk. A second filter 16 is adapted. If the adaptive second filter 16 is able to estimate and reduce the echo better than the first filter 18, then the non-adaptive filter's coefficients are is replaced by those used by the adaptive filter 16. If however, the adaptive filter 16 diverges due to double talk, the non-adaptive filter's coefficients will not be replaced. This provides an excellent immunity to the ravaging effects of double talk. However, there are two drawbacks. The first is that the complexity of the echo canceller is now considerable higher. Hence it is prohibitively expensive. Secondly, since the adaptive filter 16 must find an improved solution before its results can be used in the non-adaptive filter 18, the convergence time, or time taken to find the reflection coefficients can be unacceptably slow.

SUMMARY OF THE INVENTION

The improvement made by the present invention address two shortcomings of the prior art adaptive filters. In the present invention, the complexity of the adaptive filter process is substantially reduced. In the present invention, the convergence time is substantially improved.

The invention utilizes a non-adaptive filter and an adaptive filter as in Ochiai. In Ochiai, all possible reflection coefficients are estimated. However, in a line echo canceller, the echo originates from only a small portion of the possible delay covered by the reflection coefficients. Hence, in this invention, the computation in the non-adaptive filter 22 is considerably reduced by utilizing only the necessary reflection coefficients, those corresponding to the portion of the line responsible for the occurrence of echo. Since the non adaptive filter 22 produces the echo-free send out 15 signal, it must operate continuously.

The adaptive filter is not directly involved in the computation of echo free speech, and hence, need not operate all the time. For instance, if an optimal solution has been transferred to the non adaptive filter, the adaptive filter need not operate all. By this means, computation is effectively reduced, and it becomes feasible to implement a dual filter canceller for a reasonable cost.

The present invention, therefore has means to assess the significance of the coefficients computed by the second filter, and select only those necessary for effective echo cancellation.

Secondly, the present invention has the means to quickly react to significant uncancelled signal produced by the first non adaptive filter. If energy is observed at the send out port, it may be due to uncancelled echo, or to double talk.

Uncancelled echo would be observed if the transmission characteristics changed. This could occur if a telephone call were put on hold, a new party were conferenced in, or if there was a new telephone call. Double talk occurs when both parties talk at one.

It is not generally possible to distinguish the situation of uncancelled echo from the situation of double talk, as both manifest themselves as a significant increase in signal energy at the send out port. However, in the case of uncancelled echo, it is desirable to immediately recompute the coefficients of the second adaptive filter, and subsequently transfer the results to the first non-adaptive filter, whereas in the case of double talk, it is best not alter the non-adaptive filter. Thus the two appropriate strategies are in conflict.

This conflict is resolved with the dual canceller approach. If significant Send Out energy is observed, an attempt is made to re-compute the filter coeficients. This is called reconvergence. If this procedure is successful, then it means there was uncancelled echo and the procedure was necessary. The new results will be used in the non-adaptive filter quickly, and very little echo will be heard. If, however, the significant Send Out energy was due to double talk, then the reconvergence procedure will fail to improve the situation. The solutions obtained will not be used in the non-adaptive filter.

In a conventional canceller, there is only an adaptive filter. It is always used to cancel echo and to compute coefficients. Hence in a double talk situation, there is some inevitable corruption of the filter coefficients, and some echo is heard.

The reconvergence procedure involves first the gathering of data. Then the following mechanism is utilized rapidly determine when a situation is present and take the correct course of action:

First, a non-iterative least squares fit is attempted. This procedure is markedly different than the normal iterative approaches used by conventional echo cancellers and has the attribute of producing an immediately usable result. The filter coefficients so generated may be immediately used in the non-adaptive filter. This procedure will generally be successful in the case of uncancelled echo, but will fail in the case of double talk. In this embodiment, if an improvement is obtained, it is quickly transferred to the non-adaptive filter. The results obtained by the non-iterative procedure are further refined in the adaptive filter. Convention iterative techniques are employed for this refinement. If a further improvement is required, the improved solution is subsequently utilized in the non-adaptive filter. This procedure then need not be run again until excess energy is observed at the send out port.

BRIEF DESCRIPTION OF THE DRAWINGS

Preferred embodiments of the invention are discussed hereinafter in reference to the drawings, in which.

DETAILED DESCRIPTION OF EXEMPLARY EMBODIMENTS

Figure 1:
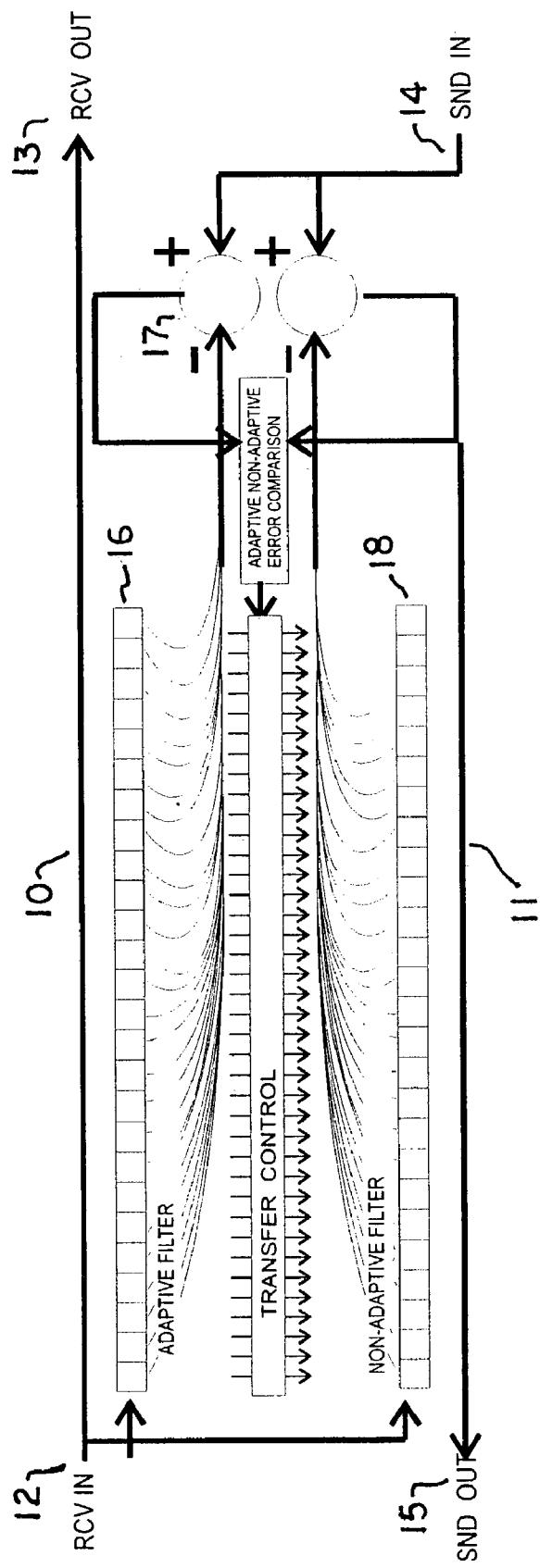
FIG. 1 is a diagram of the function of a prior art echo canceller according to the teachings of Ochiai et al.
Figure 2:
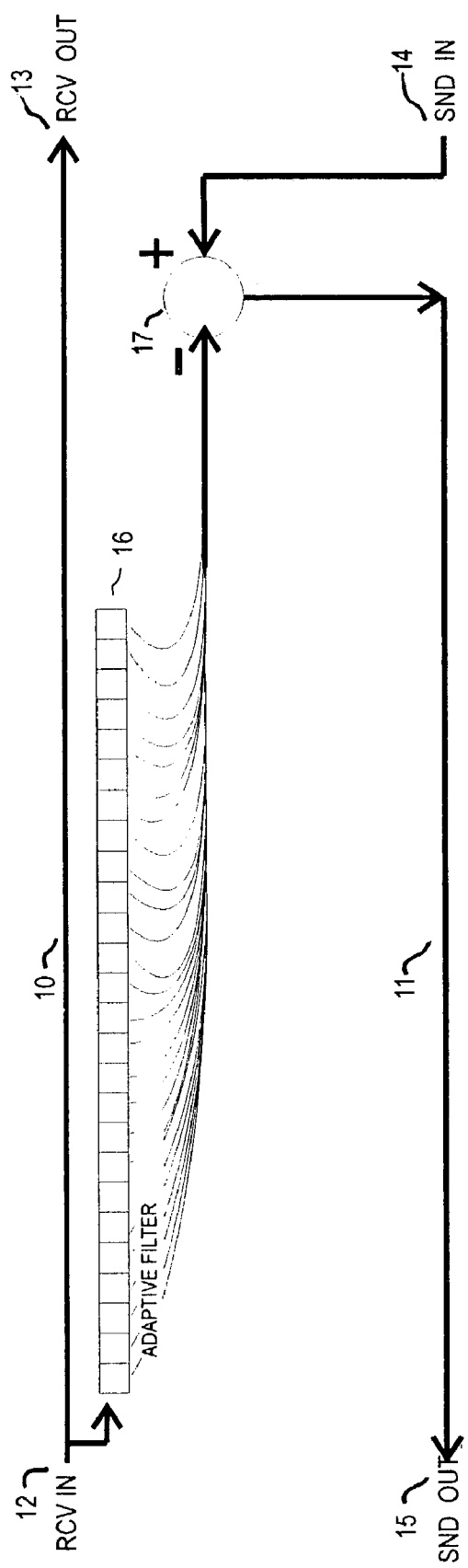
FIG. 2 is a diagram of the function of a prior art conventioanl echo canceller with a single adaptive filter.

FIG. 2 illustrates a conventional echo canceller. This echo canceller includes a receive path 10, with receive input port 12 (RCV IN), and receive output port 13 (RCV OUT). The receive path 10 represents signals from the far end. These signals do not contain echo which this canceller will remove, but rather will cause echo in the send direction 11. The send direction 11 consists of send in port 14 (SND IN) and send out port 15 (SND OUT). Adaptive filter 16 computes an estimated echo signal, y(t), according to $$y(k)=x(k)*H(k),$$

where x(k) represent samples of a the receive in signal, taken (without loss of generality) as a discrete time signal, H(k) is the impulse response of the adaptive filter, and * is the convolution operator. The estimated signal is subtracted from the send in signal, by the subtractor 17, forming the error signal or send out signal, s(k). If the impulse response, H(k) is correctly computed, the send out signal will be nearly echo free. To correctly compute H(k), iterative techniques are usually used, such as LMS algorithm or Stochastic Approximation. The coefficients of H(k) are then adjusted to minimize an error criterion, normally the square of the send out signal. When an optimum solution is obtained, the canceller is said to be converged.

In order for this to occur, the send in signal 14 must contain only echos of the receive out signal 13. If, as may commonly occur, the send in signal 14 contains signals due to speech of a talker at the near end, in addition to the echo, the computation of H(k) will be incorrect. As a result, the echo will not be entirely cancelled, and some amount of echo may be heard. The canceller may be said to be mis-adjusted, mis-converged, or diverged.

The present invention attempts to avoid this problem in two different ways.

Figure 3:
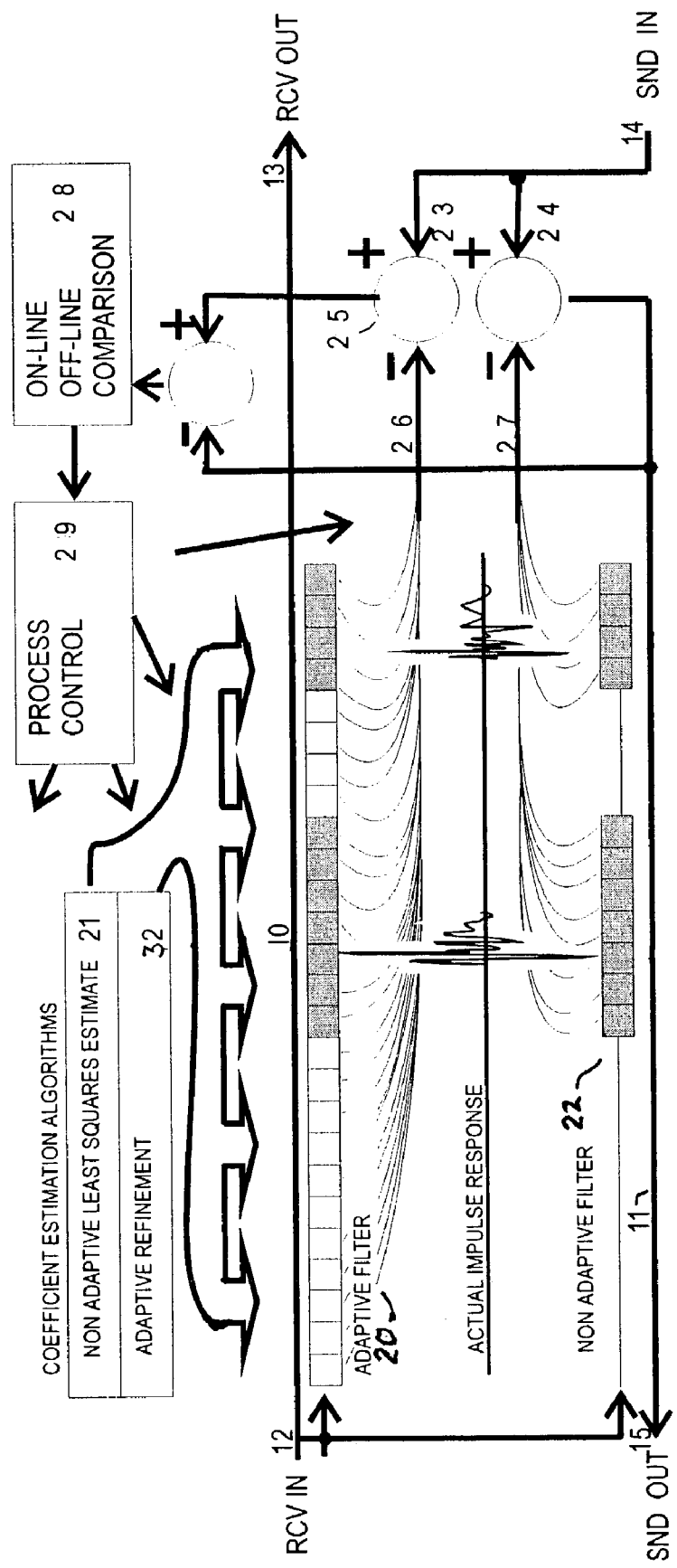
FIG. 3 is a functional block diagram of an embodiment of the present invention illustrating the use of coefficients in the adaptive and non-adaptive filters.

FIG. 3 shows an embodiment of the invention. Again the echo canceller contains a receive path 10, a send path 11 and associated in and out ports. Instead of a single adaptive filter 16, the canceller now contains two filters, one adaptive 20 and one non-adaptive 22. The non-adaptive filter 22 is used to compute the error on send out signal 15. The adaptive filter computes coefficients H(k) by utilizing two different mechanisms. The first is called Non-Iterative Least Squares Estimate 21. In this method, the send out signal is treated like a conventional least squares fit problem, for which the solution, via matrix manipulation, is well known, having been in the mathematical literature for over a century. The Non-Iterative Least Squares Estimate produces a nearly echo free result in a very short amount of time, this being 5 to 10 times shorter than that needed by a conventional echo canceller. The Non-Iterative Least Squares Estimate, however, may need further refinement, as only a relatively short portion of the possible impulse response can be estimated in this fashion. Hence, the solution in the adaptive filter can be further improved by Iterative Refinement 32. Iterative Refinement uses the results of the Non-Iterative Least Squares Estimate as an initial guess and applies an iterative process, such as LMS algorithm, and then proceeds to refine this solution until an optimal solution is obtained.

The Process Controller 29 determines when a new Non-Iterative Least Squares Estimate should be started, and it determines which of the reflection coefficients are significant and need be transferred to the Non-Adaptive filter.

Figures 4, 5:
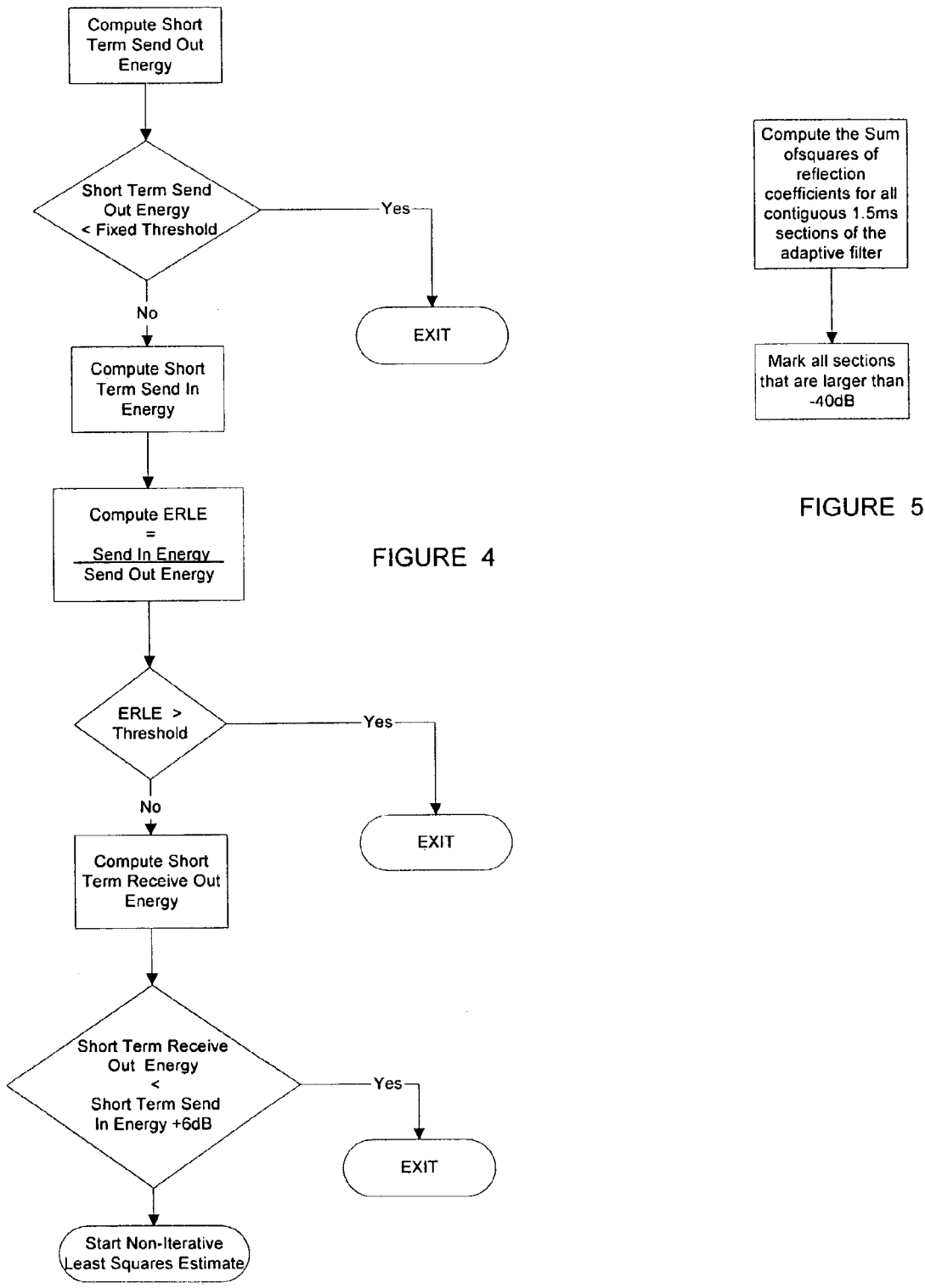
FIG. 4 is a logical flow diagram illustrating the decision for determining when a new non-iterative least squares estimate should be done.
FIG. 5 is a logical flow diagram illustrating the decision for determination of significant coefficients in the adaptive filter.

FIG. 4 is a flow chart of the process used to determine whether a new Non-Iterative Least Squares Estimate should be started. A short term energy measurement of the send out signal is computed. This energy is compared to a threshold. If the energy is below this threshold, then nothing is done and the flow chart is exited. The threshold is typically −45 dBm0. If the send out energy is higher than the threshold, then the send in energy is computed. From this, the ERLE (Echo Return Loss Enhancement) is computed as the ratio of send in energy to send out energy. If the ERLE is good (typically better than 12 dB) then the procedure is exited. If the echo canceller has diverged, due to a new call, or a change in the termination of the current call, the ERLE would be expected to be poor, and the Non-Iterative Least Squares Estimate should be started. Of course, in the case of double talk, the ERLE would likewise be poor. In this case, it will do no good to start the procedure, but will not harm the quality of the telephone call either, since the results are not used in the non adaptive filter until they are a proven improvement, If the receive out energy does not exceed the send in energy by at least 6 dB, then a double talk situation is assumed and the test is exited. If none of the comparisons cause the test to be exited, the Non-Iterative Least Squares Estimate is executed.

FIG. 5 is a flow chart to determine which coefficients in the adaptive filter are significant. It is not well know, but easily proven, that if an adaptive filter is fully converged (send out energy=0) on a white noise receive in signal, then the inverse of the ERL (Echo Return Loss) of the termination that is being adapted is numerically equal to sum of squares of the reflection coefficients. If the receive in is not a white noise signal, or if the adaptive filter in is not fully converged, then relation does not hold, but is still a useful approximation, especially if some reasonable convergence (>15 dB for instance) is observed, and the receive in signal is reasonable broad band (human speech for instance).

Hence, the procedure is to segment the adaptive filter into small pieces (1.5 ms in the illustrated exemplary embodiment, however other segment sizes can be used without departing from the invention) and determine the contribution to ERL of each segment. Each segment that has a sum of squared coefficients>−40 dB (0.0001) is marked, or selected for possible use in the non-adaptive filter.

Generally, the coefficients of the adaptive filter will be transferred to the non-adaptive filter if the adaptive filter is producing better results then the non-adaptive filter. The present invention is not limited to the exemplary method employed for determining the generation of coefficients. Alternative methodologies, such as that taught by Oshiai can be employed by the present invention. The segmentation of the adaptive filter and utilization of portions of the coefficients is taught be the present invention.

What is claimed is:

1. An echo canceller comprising:
   a receive path having a receive input and a receive output;
   a send path having a send input and a send output;
   a first non-adaptive filter for generating a first echo estimation signal;
   a second segmented adaptive filter for generating a second echo estimation signal;
   a first subtractor for receiving a send signal from said send path input and for receiving said first echo estimation signal and for generating a first compensated send signal;
   a second subtractor for receiving said send signal from said send path input and for receiving said second echo estimation signal and generating a second compensated send signal, having an output for providing said second compensated signal to said send path;
   a means to determine whether a sum of squared reflection coefficients of individual segments of said segmented adaptive filter is greater than −40 dB in said segmented adaptive filter, and for selecting only those coefficients to be used in coefficient generation for said non-adapative filter; and
   a controller connected to said send path for receiving said second compensated send signal and to said first subtractor for receiving said first compensated send signal wherein
      said controller initiates a non-iterative least squares estimate for said coefficients of said first non-adaptive filter segments corresponding to said selected segments from said adaptive filter, if:
         said short term send out energy is greater than or equal to a first fixed threshold,
         a ratio of said corresponding short term send in energy to the short term send out energy is less than or equal to a second threshold, and
         a short term receive out energy is greater than or equal to said corresponding short term, send in energy plus 6 dB.

2. An echo canceller as in claim 1, further comprising:
   a means to perform a non iterative least squares computation for fast identification of reflection coefficients.

3. An echo canceller as in claim 1, further comprising:
   a means to perform a non iterative least squares computation for fast identification of reflection coefficients; and
   a means to determine whether a sum of squared reflection coefficients is greater than −40 dB in the adaptive filter, and to cause only those coefficients to be used in the non-adaptive filter.

4. A method of determining coefficients in an echo canceller including an adaptive filter and a non-adaptive filter, comprising:
   determining a short term send out energy;
   determining a corresponding short term send in energy;
   determining a short term receive out energy; selecting segments of said adaptive filter; and
   initiating a non-iterative least squares estimate for the coefficients corresponding to said selected segments of said adaptive filter in said non-adaptive filter, if:
      said short term send out energy is greater than or equal to a first fixed threshold,
      a ratio of said corresponding short term send in energy to the short term send out energy is less than or equal to a second threshold, and
      a short term receive out energy is greater than or equal to said corresponding short term send in energy plus 6 dB.

5. A method of determining selected coefficients in an echo canceller including an adaptive filter and a non-adaptive filter, comprising:
   determining a short term send out energy;
   determining a corresponding short term send in energy;
   determining a short term receive out energy;
   selecting segments of said adaptive filter that have a sum of squared coefficients greater than −40 dB, and
   initiating a non-iterative least squares estimate for coefficients corresponding to said selected segments of said adaptive filter in said non-adaptive filter, if:
      said short term send out energy is greater than or equal to a first fixed threshold,
      a ratio of said corresponding short term send in energy to the short term send out energy is less than or equal to a second threshold, and
      a short term receive out energy is greater than or equal to said corresponding short term send in energy plus 6 dB.

* * * * *